United States Patent [19]

Webb

[11] 4,162,566
[45] Jul. 31, 1979

[54] METHOD AND COUPLING FOR SEVERING AND REJOINING SEALED TUBING

[75] Inventor: William M. Webb, Louisville, Ky.

[73] Assignee: General Electric Company, Louisville, Ky.

[21] Appl. No.: 859,770

[22] Filed: Dec. 12, 1977

[51] Int. Cl.² .................. B23P 15/00; F16L 35/00
[52] U.S. Cl. .................. 29/157 R; 29/432; 285/3; 403/283; 403/293
[58] Field of Search .......... 29/157 R, 432; 285/3, 285/4; 137/318; 403/292, 293, 298, 283

[56] References Cited

U.S. PATENT DOCUMENTS

| | | | |
|---|---|---|---|
| 2,276,571 | 3/1942 | Grypma | 174/90 |
| 2,469,975 | 5/1949 | McCloy | 228/160 |
| 2,714,447 | 8/1955 | Gardes | 228/160 |
| 2,933,333 | 4/1960 | Bredtschneider et al. | 285/3 |
| 3,127,892 | 4/1964 | Bellamy, Jr. et al. | 285/3 |
| 3,902,489 | 9/1975 | Carter | 285/3 |
| 4,004,586 | 1/1977 | Christensen et al. | 285/3 |

FOREIGN PATENT DOCUMENTS

| | | | |
|---|---|---|---|
| 1070054 | 11/1959 | Fed. Rep. of Germany | 285/3 |
| 1475799 | 3/1969 | Fed. Rep. of Germany | 285/3 |
| 1373027 | 8/1964 | France | 137/318 |

Primary Examiner—Lowell A. Larson
Assistant Examiner—Daniel C. Crane
Attorney, Agent, or Firm—Frederick P. Weidner; Radford M. Reams

[57] ABSTRACT

A method and coupling for severing and rejoining sealed tubing without the loss of the seal especially adapted to the installation of charged refrigerant lines into the refrigerator cabinetry. The method includes the crimping of the tubing wall at the point to be severed, sealing of the crimped tube walls, as by welding, and severing of the tube through the crimp. To rejoin the ends, a rejoinder coupling is utilized having end sections receiving and sealed to the crimped tube ends. The coupling also includes an axially compressible body section within which is disposed a piercing tool having a pair of penetrating ends adapted to pierce each of the crimped tube ends upon pushing the tube ends together, the compressible body section accommodating the axial tube movement toward each other in carrying out the piercing. The piercing tool is adapted to accommodate fluid flow through the pierced opening either by one or more flow passages provided in the tool itself or by withdrawal of the piercing tool from the pierced opening in each crimped tube end. Several embodiments of the piercing tool configuration are disclosed, each of which provides a locating arrangement adapted to assure penetration of both crimped tube ends when the tube ends are pushed together. The crimp configuration produces a relatively large transverse area for penetration by the piercing tool.

15 Claims, 20 Drawing Figures

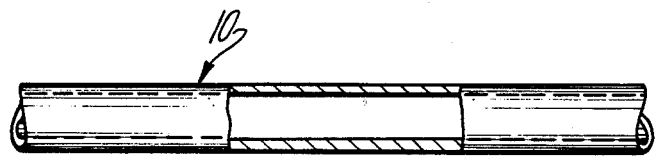
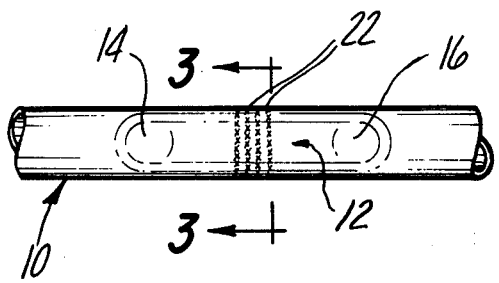
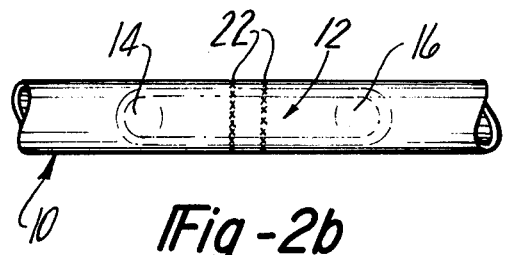
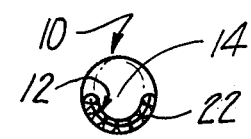
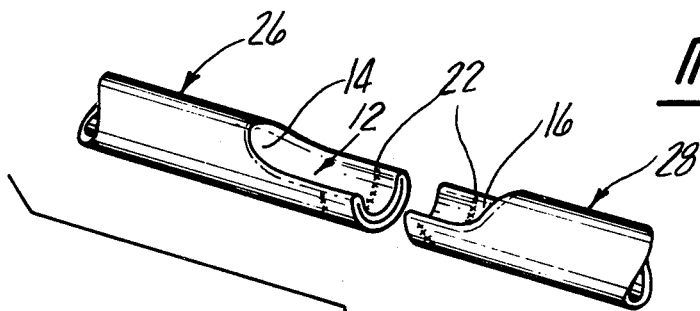
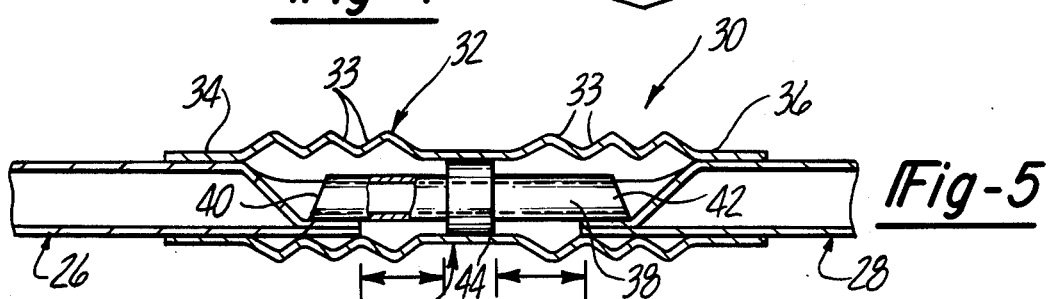
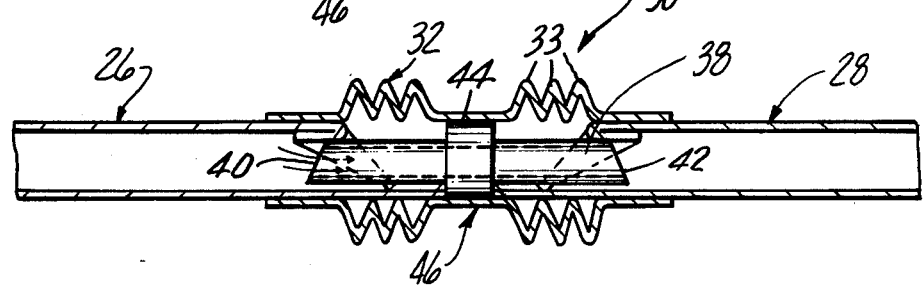

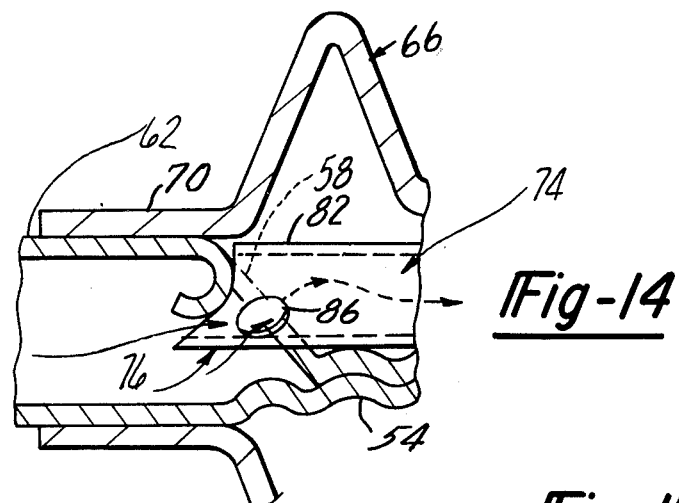
Fig-14
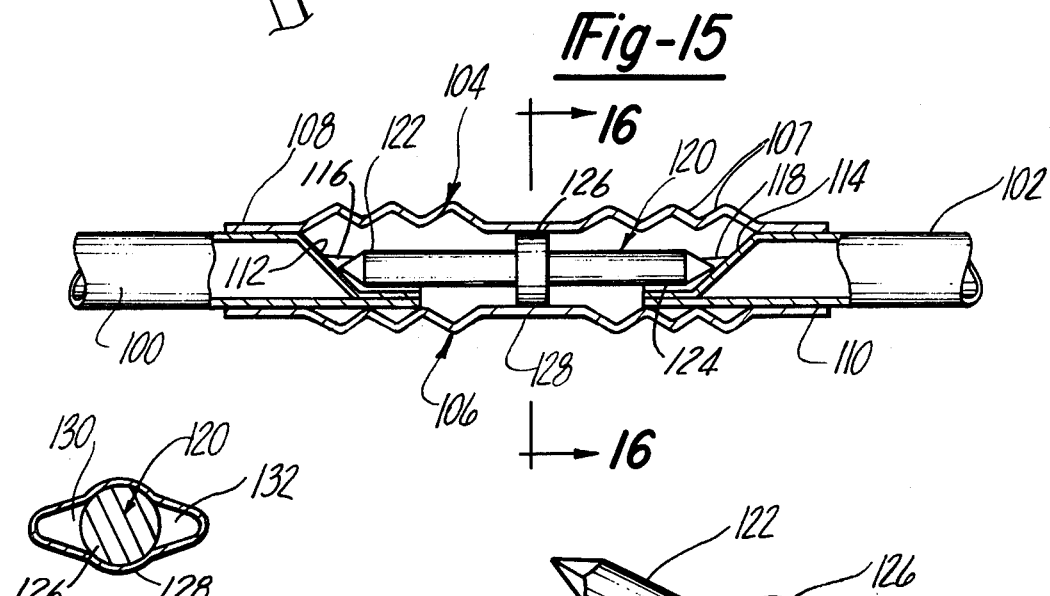
Fig-15
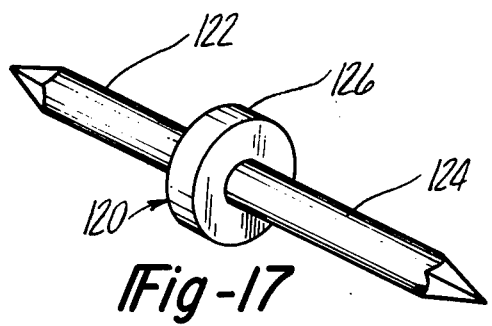
Fig-17
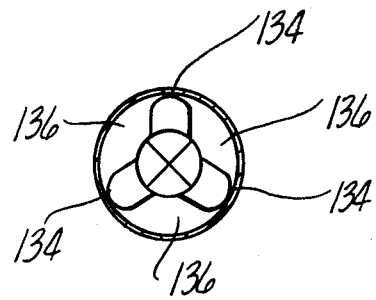
Fig-16
Fig-19
Fig-18

METHOD AND COUPLING FOR SEVERING AND REJOINING SEALED TUBING

BACKGROUND DISCUSSION

It is sometimes desirable to be able to sever a length of hermetically sealed tubing and to then be able to rejoin the severed tube ends to recreate the fluid communication within the tube, all without the loss of the hermetic seal.

One such situation is found in the manufacture of refrigeration equipment in which tubing systems are incorporated and charged with a refrigerant to provide the refrigerant circulation from the compressor-condenser to the evaporator coils of the refrigerator.

Typically, the components are located in the refrigerator cabinetry relatively remote from each other. It is highly desirable to be able to test the refrigeration system prior to installation into the refrigerator cabinetry, but this remote location of the system components renders it difficult to first assemble the refrigeration system and test for leaks, etc. and then assemble the refrigeration system into the refrigerator cabinetry. It would thus be desirable if the refrigeration system could first be assembled or tested, the tubing connecting the evaporator and compressor-condenser portion of the the system severed, the components assembled into the refrigerator cabinetry, and the severed ends rejoined without the need to recharge the system and with a high degree of assurance that the refrigeration system would function properly. Such severing and rejoining would of necessity be such that the seal would not be lost and the escape of refrigerant or the introduction of noncondensable gas, such as the atmospheric air, be prevented.

This process should also be carried out without the heating of the system to such an extent that the Freon, oil or other refrigerant be broken down into lighter constituents.

It has been heretofore known in the prior art to connect sealed lengths of tubing by means of an internal piercing element, which pierces a sealing membrane. These arrangements are presently incorporated with precharged tubing utilized in installing home air conditioning units. In these systems, the tubing ends to be connected to the evaporator and condenser coils, respectively, are charged with refrigerant with the ends of the tubing sealed by an internal diaphragm contained within the threaded coupling. Upon threading of the coupling into the corresponding fittings on the coils, a piercing element penetrates the membrane allowing the refrigerant charge to circulate through the tubing and the evaporator and condenser coils.

An example of this approach is disclosed in U.S. Pat. No. 2,933,333 to Bredtschneider et al.

While this approach has worked satisfactorily for such applications, it can be appreciated that this arrangement does not provide for an initial severing of the sealed tubing with a subsequent rejoining process. Furthermore, relatively costly fittings are required as well as an internal diaphragm seal. Cost being a crucial factor in the design of mass consumer appliances, such as refrigerators and freezers, the necessity for such prepared tube joint hardware is a significant drawback.

In U.S. Pat. No. 3,127,892 to Bellamy, Jr. et al, there is disclosed a relatively simple coupling arrangement in which a collapsible tube is utilized together with an internal piercing element to join two tube ends while the tubes remain sealed. However, that arrangement does not provide for the initial severing of the tube and furthermore does not disclose an arrangement for simply and effectively providing a joining of two sealed tube ends. Rather, the penetration by the piercing element is only with respect to a seal of one of the tubes which would not accommodate the application described above in which both severed ends would be sealed.

Another similar tube coupling arrangement with an internal seal piercing element is disclosed in U.S. Pat. No. 3,902,489 to Carter.

Both of these latter patents are disclosed in the context of blood processing or handling in which the seal is to prevent the introduction of contaminants but which is not adapted to the containment of a fluid under pressure. Rather, it is only to prevent the introduction of contaminants and the sealing arrangement and materials involved are not adaptable to pressure systems.

It is accordingly an object of the present invention to provide a method for severing a fluid pressure vessel such as hermetically sealed tubing without the loss of the seal to prevent the escape of fluid charge or the introduction of ambient air, and to further provide for rejoining of the severed ends and reestablishment of the fluid communication between the severed tube ends also without the loss of the seal.

It is another object of the present invention to provide such a method which can be carried out at relatively low cost without the need for preparing the tube ends or the use of tube fittings.

It is still another object of the present invention to provide a coupling for rejoining the severed tube ends according to the method of the present invention.

SUMMARY OF THE INVENTION

These and other objects, which will become apparent upon a reading of the specification and claims, are accomplished by a method in which the tubing to be severed is initially crimped in a manner such as to create a pair of transversely extending faces at either end of the tube ends, sealing together the crimped tube wall surfaces as by welding, and severing the tubing intermediate the crimp. To rejoin the severed tube ends, a rejoinder coupling is utilized receiving and sealed to each of the severed tube ends with a clearance gap therebetween. Within the coupling is disposed a piercing tool having a pair of oppositely extending penetrating ends. The intermediate body portion of the coupling is axially compressible to allow the tubing sealed ends to be pushed together to cause the piercing tool to penetrate each of the transversely extending faces on each tube end. The piercing element is designed to itself create fluid communication through the penetrating ends of the piercing tool, or alternatively the penetrating ends are withdrawn to allow fluid flow through the coupling to reestablish communication between the tube ends. The piercing tool may take many forms, including a hollow piercing tube which is axially located by means of a crimp on the outside diameter of the tubing section which insures that the tube end will penetrate both crimp faces upon movement of tube ends toward each other; a wedge-shaped piercing piece having shoulder portions limiting the extent of penetration, serving to insure that both faces are penetrated; a solid double-ended spike piercing tool centrally located by means of a hub section crimped onto the inside diameter of the coupling. The collapsible intermediate body portion is disclosed as of a folded wall construction to accommodate the relative axial compression required to execute the piercing movement.

DESCRIPTION OF THE DRAWINGS

FIG. 1 is a side elevational view of a section of the tubing in the refrigeration system prior to severing or rejoining.

FIG. 2 is a view of the tubing shown in FIG. 1 with a crimp and sealing weld operation having been performed thereon.

FIG. 2A is a view of the crimped tubing as shown in FIG. 1 with an alternate form of the weld.

FIG. 3 is a view of section 3—3 taken in FIG. 2.

FIG. 4 is a perspective view of the severed tube ends.

FIG. 5 is a view in partial section of the severed tube ends with a rejoinder coupling installed thereon.

FIG. 6 is a view of the tube ends and rejoinder coupling installed as shown in FIG. 5 with the tube ends pushed together after execution of the penetration step.

FIG. 14 is an enlarged view of one of the tubing ends in partial section illustrating the gas flow path through the piercing piece.

FIG. 15 shows another embodiment of the piercing tool shown installed on severed tube ends with a rejoinder coupling.

FIG. 16 is a view of the section 16—16 taken in FIG. 15.

FIG. 17 is a perspective view of the piercing tool shown in FIGS. 15 and 16.

FIG. 18 is a fragmentary view of one of the tube ends after penetration and retraction by the piercing tool shown in FIG. 15.

FIG. 19 is an endwise view of an alternate form of the piercing tool shown in FIGS. 15 through 17.

DETAILED DESCRIPTION

Figure 7:
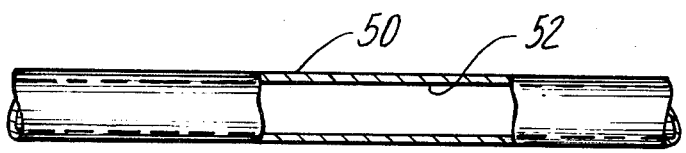
FIG. 7 depicts in fragmentary form a tube section prior to execution of an alternate rejoinder method.
Figure 8:
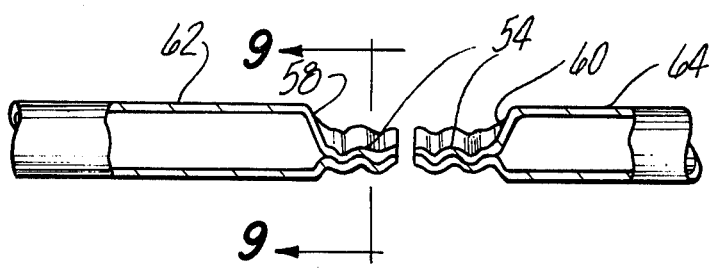
FIG. 8 shows the tube section after crimping and severing has been carried out.

In the following detailed description, certain specific terminology will be utilized for the sake of clarity and a specific embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, a fluid pressure vessel such as a section of round tubing 10 is shown in partial section, which forms a part of a hermetically-sealed fluid system such as the refrigeration system described above. The severing of the tube 10 is to take place intermediate the length shown in FIG. 1.

The initial step is indicated in FIG. 2 and comprises the formation of crimp 12 intermediate the length of the tube 10 at the point at which the severing is to be done. This crimp is of a configuration shown in FIGS. 2 and 3 and is such as to produce a pair of opposed transversely extending surfaces 14 and 16 intermediate which is a crimped section of the tube in which the side walls have been compressed with their interior surfaces in contact as shown in FIG. 3.

The crimping process is such that one portion of the tubing wall is displaced against the interior opposite portion of the wall, rather than the opposite wall portions being mutually displaced towards each other. This is done so that the transition of the displaced wall portion into the uncrimped tubing section affords the maximum area of the transverse surfaces 14 and 16 to provide end closures for the tube ends after severing, as will be described.

In addition, the displacement is carried out by folding the one wall portion into the interior arcuate form of the opposite wall portion to produce a dished crimp. This crimp shape produces after severing a trough-shaped crimped tube end which serves to minimize distortion of the uncrimped tube adjacent the tube such that the crimped tube ends are circular in section as shown in FIG. 3, and also serves as a guide for the piercing tool also to be described. Such crimping can be carried out by a suitable forming tool or die set.

After the crimp has been formed, the contacting interior wall surfaces intermediate the surfaces 14 and 16 are sealed, either by the crimping action itself or by the addition of a weld band 22 of a pair of spaced welds which can be carried out by known electrowelding processes with a minimum of heat and which will provide a secure sealing of the tube end.

Alternatively, severing processes which leave the ends sealed as by welding may be utilized.

The tube 10 is then severed intermediate the crimp 12 and the weld seals 22 to provide two severed tube ends 26 and 28. Each is similarly configured with a severed half of the crimp 12.

After the refrigeration system has been assembled into the cabinetry (not shown), the tube ends 26 and 28 are rejoined with the interiors thereof in fluid communication.

The rejoining according to the present invention is carried out by means of a rejoinder coupling 30. The rejoinder coupling 30 comprises an axially compressible hollow body section 32 with end sections 34 and 36 adapted to mate or receive the tube ends 26 and 28. To rejoin the end sections 26 and 28, the rejoinder coupling 30 is placed in position, as shown in FIG. 5, with the tube ends 26 and 28 received within the coupling ends 34 and 36. The tube ends 26 and 28 are positioned end-to-end with a clearance gap "C" provided to allow for relative axial movement towards each other.

The coupling interior itself defines a fluid pressure vessel such that after the coupling ends 34 and 36 are joined or sealed to the outside diameter of the tube ends 26 and 28 by suitable bonding or brazing techniques, piercing of the crimped tube ends 26 and 28 will provide a means to reestablish fluid communication between the tube sections.

To carry out this piercing, there is disposed within the interior of the body section 32 a piercing tool 38, in this embodiment taking the form of a hollow tube having pointed penetrating ends 40 and 42 formed by slanted cutoffs of the piercing tube ends. The interior of the piercing tool 38 thus provides means for creating the fluid communication through the rejoinder coupling 30 and the pierced tube ends 26 and 28.

Intermediate the pointed penetrating ends 40 and 42 of the piercing tool 38 in a shoulder 44 which is secured and positioned within the body section 32 by means of a crimp 46 such as to provide means for maintaining the axial position of the piercing tool 38 within the interior of the body section 32.

The double-ended piercing requires that the extent of relative movement between each tube end 26 and 28 and its respective penetrating end 40 and 42 be limited to that less than the total distance of axial compression allowed. This will insure that each penetrating end 40 and 42 is advanced into its respective tube end 26 and 28 rather than all or nearly all of the axial movement occurring by advance of only one of the penetrating ends 40 or 42. This assures that complete penetration of both transverse surfaces 14 and 16 will take place.

This limiting is accomplished in the present embodiment by the axial fixing of the piercing tool 38 to the coupling 30, which being fixed to the tube ends 26 and 28, limits relative motion therebetween.

The configuration of the penetrating ends 40 and 42 is such as to be nested within the trough-like severed crimp to guide its axial movement as the tube ends 26 and 28 are pushed towards each other in the piercing step.

The piercing step is shown in FIG. 6 after having been completed and is carried out by advancing the tube ends 26 and 28 axially towards each other, causing each of the points on the penetrating ends 40 and 42 of the piercing tool 38 to penetrate the transverse faces 14 and 16 of the respective tube ends 26 and 28, as shown.

The body section 32 of the rejoinder coupling 30 compresses to accommodate the relative axial movement of the tube ends notwithstanding the joining of the coupling ends 34 and 36. The axial compressibility of the body section 32 is provided by a series of peripheral folds or pleats 33 such as to produce a bellows-like collapsing movement thereof upon axial compression. In this embodiment, the axial fitting of the piercing tool 38 intermediate the body section 32 requires that at least one of these folds be located on either side of the crimp 46 to allow relative axial movement between the penetrating ends 40 and 42.

Upon completion of the penetration, the interior passage of the piercing tool 38 provides fluid communication therethrough to reestablish fluid communication between the tube ends 26 and 28 to thus accomplish their rejoinder. It should be noted that the tube is not required to be preequipped with fittings and thus can be carried out at any location along the length of the tube.

The rejoinder coupling 30 is preferably formed of a metal material which can be pleated as shown in FIG. 5 to provide a bellows-like movement upon axial movement of the tube ends 26 and 28 towards each other and which may be joined to the tubing 10 material. The piercing tool 38 is formed of a sufficiently hard metal such as a steel alloy to enable ready penetration of the transverse areas 14 and 16.

Referring to FIGS. 7 through 14, an alternate embodiment of this method and a rejoinder coupling is depicted. The process begins as previously with an unaltered tube 50 constituting a pressure vessel which may form a part of a hermetically sealed system such as a refrigerant loop in a refrigeration system as discussed above. The interior 52 of the tube thus defines a sealed enclosure.

Figure 9:
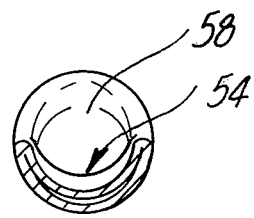
FIG. 9 is a view of section 9—9 taken in FIG. 8.
Figure 10:
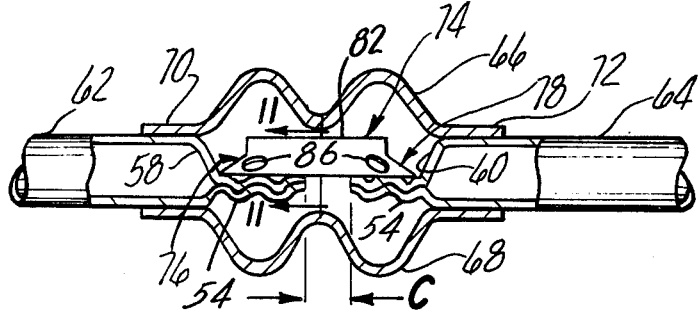
FIG. 10 shows a view of the severed tube ends received in a rejoinder coupling of an alternate form.
Figure 11:
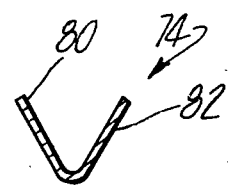
FIG. 11 is a view of section 11—11 taken in FIG. 10 through the piercing tool included in the rejoinder coupling shown in FIG. 10.

An intermediate portion of the tube is initially compressed and crimped as shown in FIG. 9 with a corrugation 54 provided to produce a crimp seal to obviate the need for a separate sealing or welding step. The crimp 54 (FIGS. 8 and 9) is asymmetrically formed with one wall of the tube 50 displaced against the interior of the other wall such that a pair of radial transverse faces 58 and 60 of maximum area are provided adjacent the crimp 54.

The tube 50 is then severed at a point intermediate the crimp 54 to create two tube ends 62 and 64, each of which remains hermetically sealed.

To rejoin the ends 62 and 64, a similar rejoinder coupling 66 is utilized including a body section 68 and a pair of ends 70 and 72 which are configured to receive the tube ends 62 and 64 providing a sliding fit such as to allow ready bonding or brazing of the ends 70 and 72 to the outside diameter of the tube ends 62 and 64, respectively. The body section is similarly shaped with at least one fold or convolution to form a bellows-like structure which accommodates relative axial movement between the tube ends 62 and 64. The position of the tube ends 62 and 64 is sufficient to provide a clearance which is sufficient to accommodate relative axial movement necessary to carry out penetration of the radial faces 58 and 60. A piercing tool 74 is provided of a substantially different configuration than that described above and includes a wedge-shaped piece having a penetrating end 76 and 79 at either end formed on either wing of the wedge shaped-piece which merges into a shoulder section 80 and 82 on the respective wings of the wedge.

Openings 84 and 86 are also formed in the shoulder portions 80 and 82 of the respective wings of the piercing tool 74 to provide improved fluid communication through the rejoinder coupling 66 after penetration. These openings are located so as to be disposed within the interior of the ends 62 and 64 after penetration to create a flow path into the space within the wedge to augment the area between the wedge within the tube interior as a flow path.

Figure 13:
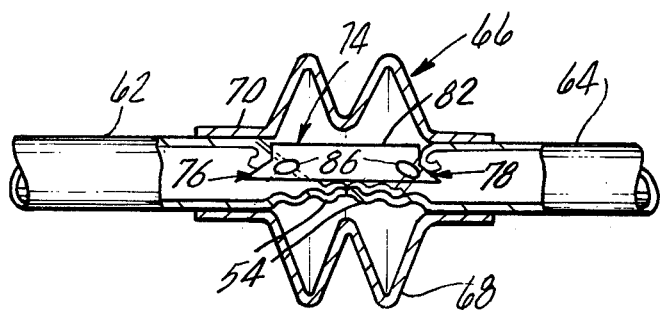
FIG. 13 shows in partial section the rejoined tube ends after execution of the penetrating step.
Figure 12:
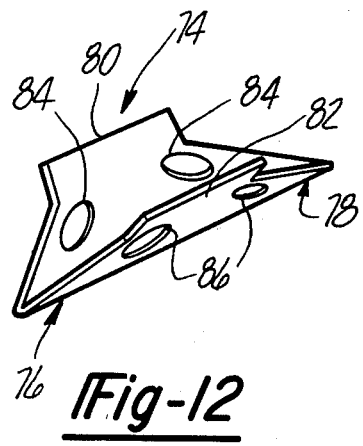
FIG. 12 shows a perspective view of the piercing tool shown in FIGS. 10 and 11.

The crimp 54 acts to guide the penetrating ends 76 and 78 into contact with the radial faces 58 and 60 as the tube ends 62 and 64 are advanced axially towards each other as indicated in FIG. 13 to cause the penetration of the radial faces 58 and 60 and the creation of fluid communication between the ends 62 and 64 via the openings 84 and 86 as shown in FIG. 14 as well as the space between the wedge wings within the tube ends 62 and 64.

The shoulder portions 80 and 82 limit the relative axial movement between each of the penetrating ends 76 and 78 and its respective tube ends 62 and 64 to assure that penetration both radial faces 58 and 60 is accomplished. That is, the penetration of one or the other of the radial faces 58 and 60 shall proceed only until the shoulders 80 and 82 come into abutment with the respective face so that any further axial movement must result in penetration of the other radial face.

Other embodiments of the piercing tool are shown in FIGS. 15 through 18 which depict a solid piercing tool which requires a double movement to reestablish fluid communication, i.e., the penetrating compression of the tube with a subsequent axial retraction of the tube ends to provide withdrawal of the solid penetrating tool so as to allow communication via the resultant formed opening on the respective radial faces. While requiring a double movement, the penetration of the solid member is somewhat more sure.

Referring to FIGS. 15 through 17, tube ends 100 and 102 are to be joined by means of a rejoinder coupling 104. Rejoinder coupling 104 includes the body section 106 formed with peripheral folds 107 such as to allow axial movement and also includes a pair of ends 108 and 110 similarly receiving the tube ends 100 and 102 sealed thereto. The tube ends 100 and 102 have previously been crimped as described above to form the transverse areas 112 and 114 with the crimp also providing an arcuate guide surface by the upper wall of the tubing being collapsed into the interior curved portion of the lower half of the tube.

With the coupling 104 in place, a piercing tool 120 is disposed with a pair of penetrating ends 122 and 124 nested within the guide surface created by the crimp sections 116 and 118 with the pointed ends directed at the transverse areas 112 and 114.

The piercing tool 120 is joined to the coupling 104 by means of an intermediate shoulder 126 retained within a crimp 128 formed in the body section 106. This acts to axially locate the piercing tool 120 within the body section 106 to insure penetration of both areas 112 and 114 and also serves to retain the piercing tool 120 as an assembly with the rejoinder coupling 104.

The crimp 128 is provided with passages 130 and 132 to allow bypass fluid flow around the shoulder 126. Alternatively (FIG. 19), the shoulder can be provided by a three-lobed section in which the plurality of lobes 134 are provided with the interstices 136 accommodating the bypass fluid flow.

Accordingly, by the use of relatively simple rejoinder couplings and forming and sealing steps, a hermetically-sealed fluid vessel such as a length of tubing may be severed and rejoined without losing the hermetic seal.

It is noted that in each of the embodiments, a relatively small quantity of atmospheric air will of necessity be introduced unless separate steps are taken to evacuate or change the interior of the rejoinder coupling. However, for the applications described above, the quantity of atmospheric air introduced is inconsequential and need not be eliminated for successful use of the method. While the rejoinder coupling has been disclosed in conjunction with the rejoinder of severed tube ends having the crimped ends and resultant transverse faces, a coupling may be applied to other applications in which a joining of two separate fluid vessel or tube ends which are sealed is desired without the use of costly fittings.

Many forms and variations of the invention are of course possible, i.e., the means for allowing the axially compressible body section of the rejoinder coupling or many different variations of the piercing tool or of the configuration of the crimp, although the specific configuration described has particular utility and advantages noted in the description of the respective embodiments.

I claim:

1. A method of severing and rejoining a fluid pressure vessel intermediate its length thereof, the method comprising the steps of:
    crimping together the walls of said fluid pressure vessel at a point at which said fluid pressure vessel is to be severed;
    sealing together the interior contacting surfaces of said crimped walls;
    severing said fluid pressure vessel intermediate said sealed areas of said crimped walls to form crimped fluid pressure vessel ends;
    placing said severed fluid pressure vessel ends within a coupling member, said coupling having a rejoinder coupling body section formed with collapsible portions to enable axial compression thereof and a pair of integral end sections, each configured to receive a respective one of said crimped ends, with said crimped ends being spaced apart within said coupling;
    sealing together a respective coupling end section with a respective severed fluid pressure vessel end;
    disposing within said body section, prior to assembly thereof of said respective fluid pressure vessel severed ends, a piercing tool, said piercing tool having oppositely directed penetrating ends with said piercing tool being positioned in said rejoinder coupling body section during said disposing step with each of said penetrating ends directed towards a respective fluid pressure vessel end;
    moving said crimped fluid pressure vessel ends axially towards each other to advance each of said piercing tool penetrating ends towards a respective crimped fluid pressure vessel end to cause penetration of each of said crimped fluid pressure vessel ends;
    establishing fluid communication through said penetrated crimped fluid pressure vessel ends and said interior of said rejoinder coupling body section to thereby reestablish fluid communication between said fluid pressure vessel ends.

2. The method according to claim 1 wherein in said crimping step, one wall of said fluid pressure vessel is displaced into engagement with the interior surface of the opposite wall of said fluid pressure vessel whereby a pair of transverse surfaces are created by said displaced wall transitioning into an uncrimped section of said pressure vessel and wherein in said disposing step, said penetrating ends of said piercing tool are directed at said pair of transverse surfaces.

3. The method according to claim 2 wherein said fluid pressure vessel comprises a circular in section tube and wherein in said step of displacing said wall portion of said fluid pressure vessel in said tube, said one wall portion is displaced into the interior arcuate surface of said opposite wall, whereby said resulting crimp creates circular-in-section trough-shaped crimped ends after severing thereof and wherein in said positioning step, said penetrating ends of said piercing tool are disposed extending into said trough portions of said severed fluid pressure vessel ends, whereby said piercing tool is axially guided into piercing engagement with said transverse surfaces during said piercing step.

4. The method according to claim 1 wherein said step of sealing said crimped wall portions of said fluid pressure vessel comprises the step of welding together said contacting walls along an area thereof through said crimped area of said fluid pressure vessel and wherein in said severing step said wall portions are severed intermediate said welded area.

5. The method according to claim 1 further including the step of limiting the axial movement of said penetrating tool relative to each of said crimped fluid pressure vessel ends, said limited movement being less than the distance said pressure vessel ends are movable toward each other by compression of said body section and the spacing between said fluid pressure severed ends within said body section, whereby complete penetration of both of said compressed fluid pressure vessel ends is assured.

6. The method according to claim 5 wherein said step of limiting said relative movement comprises the step of fixing said piercing tool with respect to said rejoinder coupling.

7. The method according to claim 6 wherein said step of limiting said relative movement of each of said severed fluid pressure ends and a respective penetrating end comprises the step of providing a shoulder located at either end of said penetrating ends limiting the extent of penetration of said penetrating ends into said compressed fluid pressure ends.

8. The method according to claim 3 wherein in said step of displacing said one wall portion against the interior of said other wall portion includes the formation with a crimping step wherein said one wall portion is displaced by folding said one wall into contact with said arcuate interior surface of said opposite wall portion forming a dished depression in said tube, whereby said resultant crimp cross-sectional area is arcuate in section.

9. The method according to claim 1 wherein said step of establishing fluid communication through said pierced transverse surfaces includes the step of providing openings within said piercing tool whereby said fluid communication is established through said pierced transverse surfaces and through said piercing tool openings, whereby fluid communication is established between said severed fluid pressure vessel ends.

10. The method according to claim 1 wherein said step of creating fluid communication through said interior of said body section of said rejoinder coupling comprises the step of withdrawing said penetrating ends from said pierced openings formed in said transverse surfaces of said fluid pressure vessel ends to establish fluid communication through the interior of said rejoinder coupling body section.

11. The fluid pressure vessel joint made according to the method of claim 1.

12. The fluid pressure vessel joint made according to the method of claim 4.

13. The fluid pressure vessel joint made according to the method of claim 9.

14. The fluid pressure vessel joint made according to the method of claim 10.

15. A method of severing and rejoining a fluid pressure vessel intermediate its length thereof, the method comprising the steps of:
crimping together the walls of said fluid pressure vessel at a point at which said fluid pressure vessel is to be severed;
sealing together the interior contacting surfaces of said crimped walls;
severing said fluid pressure vessel intermediate said sealed areas of said crimped walls to form crimped fluid pressure vessel ends;
placing said severed fluid pressure vessel ends within a coupling member, said coupling having a rejoinder coupling body section and a pair of end sections, each configured to receive a respective one of said crimped ends, with said crimped ends being spaced apart within said coupling and movable towards each other;
sealing together a respective coupling end section with a respective severed fluid pressure vessel end;
disposing within said body section, prior to assembly thereof of said respective fluid pressure vessel severed ends, a piercing tool, said piercing tool having oppositely directed penetrating ends with said piercing tool being positioned in said rejoinder coupling body section during said disposing step with each of said penetrating ends directed towards a respective fluid pressure vessel end;
moving said crimped fluid pressure vessel ends axially towards each other to advance each of said piercing tool penetrating ends towards a respective crimped fluid pressure vessel end to cause penetration of each of said crimped fluid pressure vessel ends;
establishing fluid communication through said penetrated crimped fluid pressure vessel ends and said interior of said rejoinder coupling body section to thereby reestablish fluid communication between said fluid pressure vessel ends.

* * * * *